Aug. 15, 1933.  C. LARSEN  1,922,964
WIND DEFLECTOR SHIELD
Filed Oct. 16, 1931  2 Sheets-Sheet 1
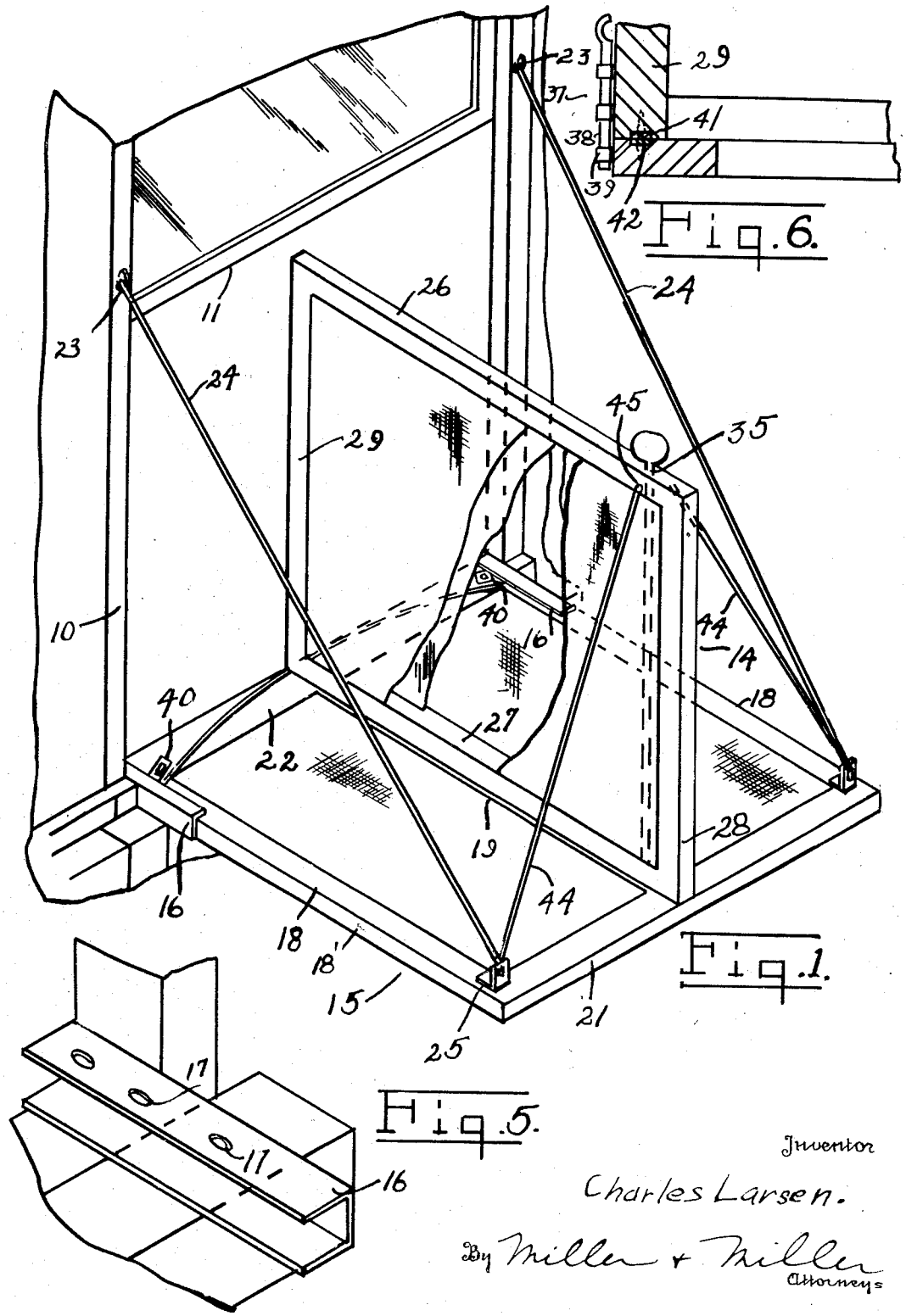
Inventor
Charles Larsen.
By Miller + Miller
Attorneys Aug. 15, 1933.　　　　C. LARSEN　　　　1,922,964
WIND DEFLECTOR SHIELD
Filed Oct. 16, 1931　　　2 Sheets-Sheet 2
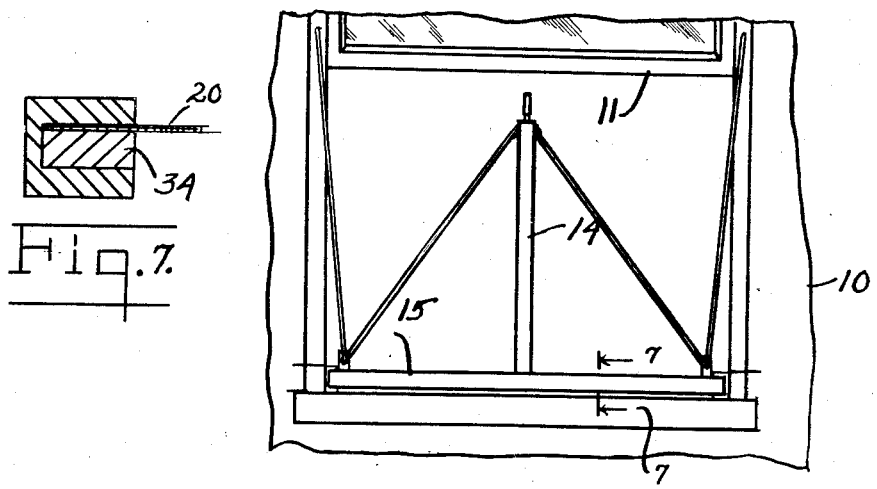
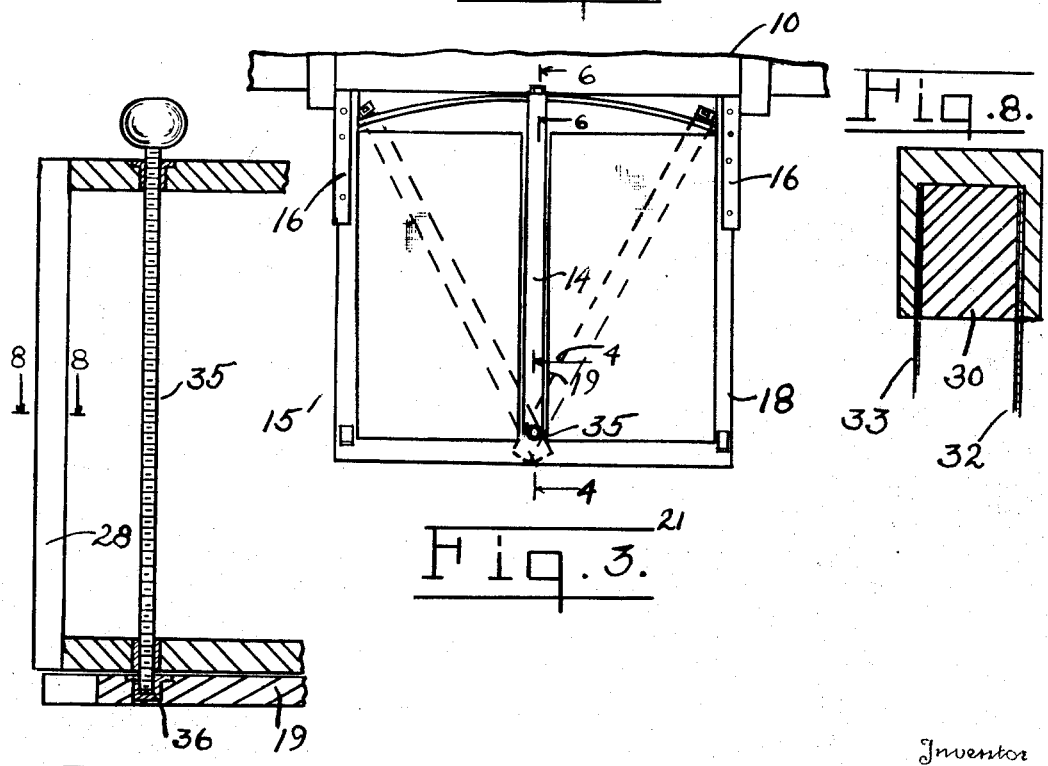
Inventor
Charles Larsen.
By Miller & Miller
Attorneys Patented Aug. 15, 1933

1,922,964

UNITED STATES PATENT OFFICE 1,922,964

WIND DEFLECTOR SHIELD

Charles Larsen, Astoria, N. Y.

Application October 16, 1931. Serial No. 569,312

2 Claims. (Cl. 98—44)

This invention relates to a wind deflector and has for an object to provide an improved wind deflector to be placed on window frames to assist in ventilation in the home, offices or other buildings.

It is a further object of this invention to provide an improved wind deflector which will serve to deflect the wind or the air current into the window irrespective of whether this air current is travelling downwardly or in any horizontal direction, provided the same strikes the deflector.

It is a further object of this invention to provide a wind deflector which may be adjusted or set as a sail is set to deflect the maximum or desired amount of air in through the window.

With the foregoing and other objects in view, as will hereinafter become apparent, this invention comprises the constructions, combinations and arrangements of parts, hereinafter set forth, claimed, and shown on the accompanying drawings. In these drawings, Figure 1 is a perspective view of the wind deflecting shield in position on a window frame.

Figure 2 is a front plan view of Figure 1.

Figure 3 is a top plan view of Figure 1.

Figure 4 is a detailed section on line 4—4 of Figure 3.

Figure 5 is a perspective view of the slide rail fastened in place on a window frame for receiving the lower wind deflector shield.

Figures 6 and 7 are cross sectional details on lines 6—6 and 7—7 of Figures 3 and 2 respectively, and Figure 8 is a cross sectional detail on line 8—8 of Figure 4.

There is shown at 10 a representation of a conventional window frame, the lower sash having been raised as at 11. The wind deflector shield comprises a vertical shield 14 and a horizontal shield 15. This wind deflector shield is intended to be removable from the window frame 10 when it is not desired to use the same, as in rainy weather or otherwise.

Affixed to the window frame 10 are a pair of brass or metallic guides 16 which may be suitably and permanently affixed thereto by any convenient means not shown, so that it will not interfere with the closing of the window sash 11. This pair of guides form a holder to receive the horizontal shield 15, and the plurality of openings 17 are formed in the guides 16, whereby screws or dowel pins may be placed thereto into corresponding holes in the frame 18 of shield 15, for holding the same in position. The shield 15 is formed of a rectangular frame having opposite sides 18, a center piece 19, an outside end piece 21 and an inner end piece 22 parallel to the outer side. The openings between the frame 18 and the center piece 19 are covered by a piece of canvas, silk, aeroplane fabric, or like fabric 20, treated to make the same substantially air proof.

Eye members 23 secured in the window frame 10 receive a pair of bracing wires 24, the other ends of which are secured to the shield 15 by means of apertured angle members 25. As will be obvious, the shield 15 is thus securely held in position by the brace wires 24 securing the outer end and the guide members 16 holding the inner ends of side members 18. The vertical shield 14 is formed of rectangular framework having a top 26, a bottom 27, an outside end piece 28 and an inside end piece 29. These shield elements 26, 27, 28 and 29 may be U-shaped in cross section, as shown in Figure 8 and have a filler piece 30, whereby to hold two pieces of wind proof fabric 31 and 32, it being noted that the side and end elements of frame 15 have a similar filler element 34 for holding the fabric 20 in position. It will be understood, however, that any other suitable means of attaching the fabric to the framework may be substituted therefor.

The shield 14 is placed over the center piece 19 of shield 15 in normal position, being held therein by the bolt 35 passing through the sides 26 and 27 between fabrics 32 and 33, and into a threaded receptacle 36 affixed in center piece 19. Affixed along the edge of end 29 is a lock 37 having a lock plunger 38. A plunger receptacle 39 is affixed to the edge of the side member 22 and a pair of lock receptacles 40 are fixed near each end of the side member 22 of shield 15.

In operation, the shield 15 is placed in the guides 16 and the brace wires 24 are hooked to the angle members 25, thus holding the shield 15 in position although dowel pins or screws may be inserted through the openings in the top of guides 16, as desired. The shield 14 is placed over the center piece 19 of shield 15 and the bolt 35 fastened to receptacle 36. This allows the shield 14 to pivot about bolt 35, as shown in dotted line in Figure 3, which movement may be caused by either manual operation or wind pressure against said shield 14. The lock plunger 38 may be then pressed into the plunger receptacle 39 or either receptacle 40, thus holding the shield 14 either over the center piece 19 or at an angle as shown in dotted outline in Figure 3.

Obviously, additional receptacles 40 might be placed along the path of the lock plunger 39 to hold it at any other desired position. To reduce wear and tear to a minimum should the frameworks of shields 14 and 15 be made of wood, a metal button 41 is placed in the bottom of side 29 and a metal track 42 is countersunk in the end 21 under the path of button 41. Thus, when the shield 14 is swung to any angular position, the button 41 will ride on track 42 and assist in bracing the same when the plunger 38 is placed in any of the appropriately placed receptacles 39 and 40.

As will be apparent, this wind deflector shield can be set to deflect a maximum, a normal, or a minimum amount of air into the window, the shield 15 being set to deflect any downwardly moving currents into the window, while the shield 14 will deflect any horizontally moving currents of air. If it is desired to increase the amount of air being deflected by the shield 14, the shield 14 may be swung around the bolt 35 as a pivot and locked in position by means of the lock 37, so as to either decrease or increase the amount of air being deflected thereby, depending upon the desired result and the prevailing wind at the time.

Another set of bracing wires 44 are provided which assist in holding the vertical shield 14 in position. The bracing wires 44 are received at one end by a pair of eye members 45 secured in the top 26 of shield 14 and at the other end are secured to the angle members 25 which likewise secure bracing wires 24. As will be apparent, eye members 45, being located in the plane of the bolt 35, the vertical shield 14 may still pivot about 45 and be secured in any of the angular positions in Figure 3 without interfering whatsoever with the efficiency of either pair of the bracing wires 24 or 44.

The novel features and the operation of this device will be apparent from the foregoing description. While the device has been shown and the structure described in detail, it is obvious that this is not be considered limited to the exact form disclosed and that changes may be made therein within the scope of what is claimed without departing from the spirit of the invention.

Having thus set forth and disclosed the nature of this invention, what is claimed is:

1. A wind deflector shield comprising a pair of rectangular shields, one of said shields comprising a rectangular framework and a center piece bisecting the same, fabrics secured to said center piece and said framework forming a wind proof shield, the other of said shields comprising a rectangular framework and wind proof fabric secured to said framework on each side thereof, means for holding the first of said shields to a window frame, means for pivoting the second of said shields at one end of the center piece of the first of said shields, and means for locking the other end of said second shield at a desired angle to said first shield.

2. An adjustable wind deflector shield comprising a horizontal shield and a vertical shield, means for embracing and securing said horizontal shield to a window frame, said means comprising a pair of guide members for receiving and embracing one side of said horizontal shield, and a pair of wire members detachably secured to the opposite sides of said windshield and to the window frame, means for adjustably securing said vertical shield to said horizontal shield, said means comprising a pivoting bolt securing said vertical shield to said horizontal shield adjacent one end of said vertical shield, and a locking means secured at the other end of said vertical shield and cooperating with said horizontal shield to hold said vertical shield at different angular adjustments therealong, an anti-wear button secured to the bottom of said vertical shield and an anti-wear track secured to said horizontal shield and cooperating therewith.

CHARLES LARSEN.